July 20, 1948.  L. P. MUSSO  2,445,534
SPOOL SUPPORT
Filed Sept. 26, 1946
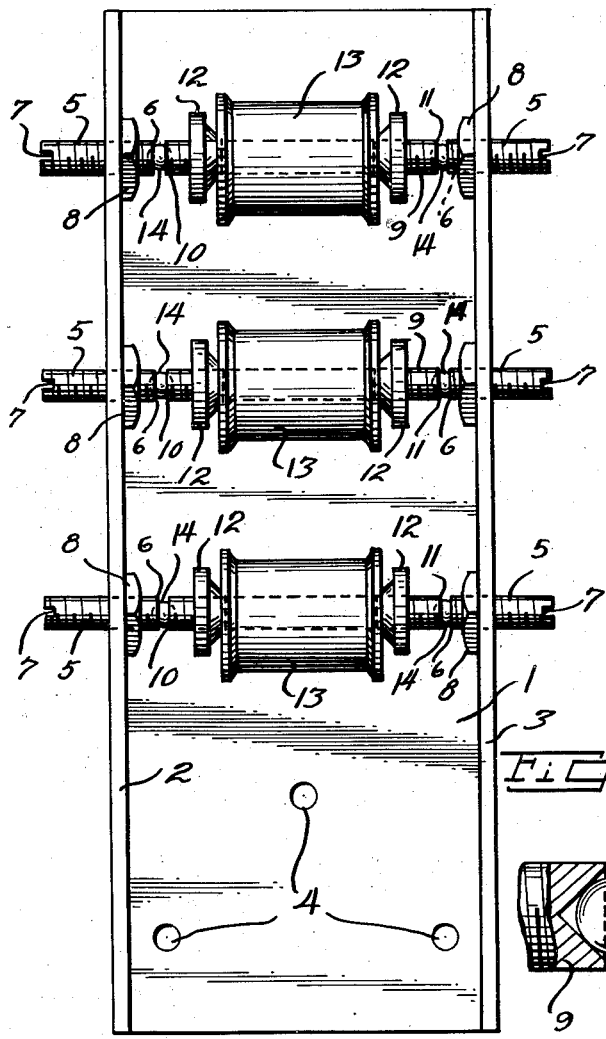
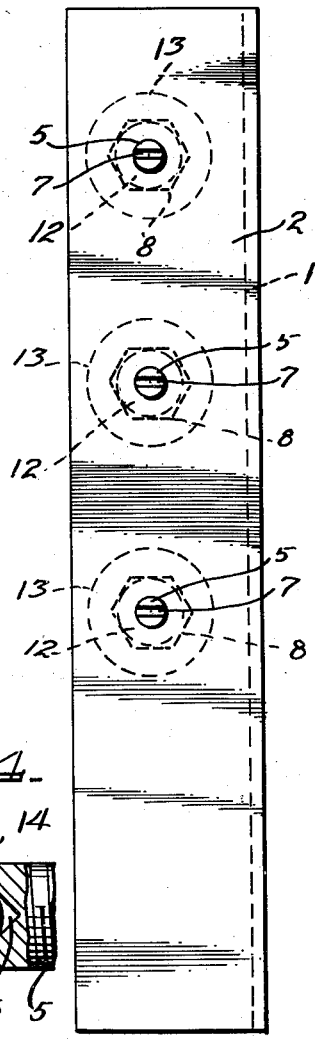
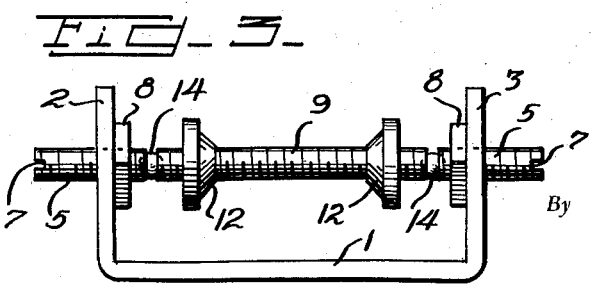
Inventor
Leo P. Musso
By
Attorneys Patented July 20, 1948

2,445,534

UNITED STATES PATENT OFFICE 2,445,534

SPOOL SUPPORT

Leo P. Musso, Ecorse, Mich., assignor of forty-nine per cent to Clara Ann Kemper, Lincoln Park, Mich.

Application September 26, 1946, Serial No. 699,556

2 Claims. (Cl. 242—130)

1

This invention relates to new and useful improvements in fishing devices and more particularly fishing spool supports.

The primary object of the present invention is to provide a novel and improved fishing rod winder comprising a U-shaped supporting frame for supporting a plurality of spools of differently colored thread and for adjustably and variably tensioning the spools so that the desired color of thread may be wound on fishing rods for supporting line guides thereon.

Another object of the invention is to provide an improved fishing spool support for supporting a number of spools of thread, together with means for variably adjusting the tension on the thread while winding the same on fishing rods to support line guides on said rods and for making reinforcing windings.

Another object of the invention is to provide an improved fishing spool support which will be highly efficient in operation, and relatively inexpensive to manufacture and produce.

Other objects will appear as the description proceeds.

In the accompanying drawings which form a part of this application—

Figure 1 is a front elevation of the improved fishing spool support;

Figure 2 is a side view of the improved fishing spool support;

Figure 3 is a top edge view of the improved fishing spool support, and

Figure 4 is a detail sectional view of a ball bearing tensioning adjustment for each end of a spool supporting shaft.

Like characters of reference are used throughout the following specification and the accompanying drawings to designate corresponding parts.

In carrying out the invention, there is provided an improved spool support or fishing rod winder comprising a U-shaped supporting frame having a base or back 1 and spaced forwardly extending sides 2 and 3 formed integrally therewith, the same being made of any desired metal or plastic, or any other material. A plurality of apertures 4 will be formed through the lower end 7 of the base or back 1, through which attaching screws (not shown) may be inserted.

The opposite sides 2 and 3 will be formed with a plurality of transversely aligned threaded openings through which the threaded adjusting rods 5 will extend, the same being formed with cone-shaped bearing seats 6 in their inner ends and with the kerfs 7 in their outer ends, whereby the same may be adjusted by means of a screw driver (not shown). Lock nuts 8 will be disposed on the rods 5 and will be screwed tightly against the inner surfaces of said side frame members 2 and 3, to retain the rods 5 in their adjusted positions.

2

Threaded spool supporting rods 9 will be formed with the cone-shaped bearing seats 10 and 11 in their opposite ends, and will support the threaded spool supporting cone heads 12 which will be tightly screwed into the opposite ends of the threaded spools 13 to lock the same tightly on said rods 9.

Ball bearings 14 will be disposed between the adjacent ends of the rods 9 and the adjusting rods 5 between the seats 6 and 10, and 6 and 11, whereby the thread on the spools 13 may be variably and adjustably tensioned the desired amount to tightly wind the same on fishing rods for attaching line guides thereon, or for reinforcing the fishing rods. As before mentioned, various colors of thread may be used and efficiently wound upon the fishing rods.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention, what I claim as new and desire to secure by Letters Patent of the United States is:

1. A spool support comprising a U-shaped frame, tension adjusting rods extending through the sides thereof, spool supporting rods rotatably mounted between the inner ends of said tension adjusting rods, spool locking cone heads adjustably supported on said spool supporting rods, and oppositely disposed cone-shaped bearing seats formed in the adjacent ends of said spool supporting rods and said tension adjusting rods.

2. A spool support comprising a U-shaped frame, tension adjusting rods extending through the sides thereof, spool supporting rods rotatably mounted between the inner ends of said tension adjusting rods, spool locking cone heads adjustably supported on said spool supporting rods, oppositely disposed cone-shaped bearing seats formed in the adjacent ends of said spool supporting rods and said tension adjusting rods, and ball bearings disposed between said cone-shaped bearing seats.

LEO P. MUSSO.

REFERENCES CITED

The following references are of record in the file of this patent:

UNITED STATES PATENTS

| Number | Name | Date |
|--------|------|------|
| 153,212 | Babbitt | July 21, 1874 |
| 239,518 | Le Roy | Mar. 29, 1881 |
| 654,584 | Anderson | July 21, 1900 |